United States Patent Office 3,123,586
Patented Mar. 3, 1964

3,123,586
GLYCIDYL ETHERS OF MONONUCLEAR POLYHYDRIC PHENOL - KETONE CONDENSATION PRODUCTS AND PROCESS OF MAKING SAME
John B. Rust and Charles L. Segal, Los Angeles, Calif., assignors to Hughes Aircraft Company, Culver City, Calif., a corporation of Delaware
No Drawing. Filed May 3, 1960, Ser. No. 26,434
17 Claims. (Cl. 260—50)

This invention relates to new epoxy resin compositions possessing novel properties and to methods of making same. More particularly, the invention is concerned with glycidyl ether derivatives of mononuclear polyhydric phenol-ketone condensation products in which the phenolic hydroxyls have been substantially completely etherified.

It is an object of this invention to produce novel epoxy derivatives by the epoxidation of fusible, soluble mononuclear polyhydric phenol-ketone condensation products which epoxy derivatives may undergo further reaction through the glycidyl ether group to form more highly polymerized complex plastic products. It is another object of this invention to provide epoxy derivatives of normally permanently fusible and soluble polyhydric phenol-ketone resins which epoxy derivatives may be cured or rendered insoluble and in such form to possess excellent chemical resistance, adhesion and the like.

It is a further object of this invention to make available epoxy resin compositions which are particularly useful in electronic applications because of their physical and electrical characteristics in such forms as coating compositions, encapsulating and potting compounds, molded articles, films and the like.

Epoxy-containing resins are known commercially and enjoy widespread use due to their unique and versatile properties. Some of the better known epoxy resins are prepared by condensing 2,2-bis(4-hydroxyphenyl) propane with epichlorohydrin in an alkaline medium. Other examples of known commercial or experimental epoxy-containing resins are those prepared by the alkaline condensation of epichlorohydrin and bis(4-hydroxyphenyl) methane, 2,2,4,4-tetrakis(4-hydroxyphenyl) pentane, phloroglucinol, resorcinol, and the like. These resinous compositions are capable of undergoing further reaction, cross-linking, and cure through the epoxy groups in the presence of initiators, such as amines, carboxylic acid anhydrides, and the like. Furthermore, there has been proposed a class of epoxy resins prepared by condensing a phenol-, or alkylphenol-aldehyde novalak resin with epichlorohydrin under alkaline conditions. These resins are multifunctional and cure readily by the incorporation of suitable polymerization catalysts.

We have now found that it is possible to prepare a new class of resin that possesses outstanding properties and a variety of important electrical and electronic applications. Furthermore, many forms of the new resins of this invention possess the combined properties of high softening point and excellent solubility in a large number of petroleum, aliphatic and aromatic solvents which is an attribute not normally encountered in epoxy resins. The high degree of functionality of the new class of resins of this invention permits them to be cured rapidly and completely upon proper catalysis. The solubility of these resins allows them to be plasticized with a variety of both low molecular weight plasticizers and high molecular weight polymeric plasticizers. Their high softening characteristics impart a property which is desirable for the formulation of compression molding compositions which is a characteristic not possessed by many epoxy resins of the prior art.

The new class of resins of the present invention are prepared by condensing epichlorohydrin in alkaline medium with a resin prepared by the reaction of a mononuclear polyhydric phenol with a ketone in acid media. The polyhydric phenol-ketone resins are fusible, soluble and oil-reactive. They are prepared by the condensation of one mole of mononuclear polyhydric phenol with, for instance, from one to five moles of a ketone in the presence of a strong acid, such as hydrochloric acid, sulfuric acid, chloroacetic acids, phosphoric acid, and the like.

The preparation of the new class of glycidyl ethers of the mononuclear polyhydric phenol-ketone resins is carried out in one embodiment of this invention by mixing and dissolving the mononuclear polyhydric phenol-ketone resin in at least two moles of epichlorohydrin for each free phenolic hydroxyl group of the resin and adding about one mole of alkali metal hydroxide for each free phenolic hydroxyl group. The alkali hydroxide may be added as a solid or in solution and the reaction which occurs is exothermic. The reaction temperature is maintained, with efficient mixing, at about 70° C. to about 140° C. until the alkali hydroxide has been consumed.

The mononuclear polyhydric phenol-ketone resins used in the preparation of the new epoxy resins of this invention can be prepared by procedures given in detail in the examples given below. As examples of the mononuclear polyhydric phenols which can be employed in the practice of this invention, the following are cited: resorcinol, orcinol, 1,3-dihydroxy-5-alkyl benzene, 1,3-dihydroxy-5-arylbenzene, pyrogallol, catechol, phloroglucinol, hydroquinone, urusiol, hydroxyhydroquinone, and the like. As examples of ketones which can be reacted with the mononuclear polyhydric phenols, the following are illustrative: acetone, methyl ethyl ketone, cyclohexanone, mesityl oxide, phorone, isophorone, methyl isobutyl ketone, diisopropyl ketone, acetophenone, diisobutyl ketone, acetylacetone, acetonylacetone and the like. The various combinations of mononuclear polyhydric phenol with ketone produce a variety of resinous products some of which are low molecular weight oils, some soft balsam-like compositions and some hard, high melting resins. Furthermore, depending upon the reactivity, acid sensitivity, and state of purity the resins range in color from dark colored products to very pale yellow or substantially colorless compositions. Persons skilled in the art can make the necessary selections of those products most fitting for a specific application. As a general guide, the use of high molecular weight and cyclic ketones yield resins which are more soluble in solvents, and the use of cyclic and aromatic substituted ketones produce resins of higher fusion temperature. On the other hand, similar variations in solubility and softening point can be achieved by using different alkylated polyhydric phenols. In cases where an alkylated resorcinol is employed, it is preferable but not essential that it be substituted in the 5-position. In general, the mononuclear polyhydric phenol-ketone resins are fusible and soluble and are not curable or cross-linkable by reaction with excess ketone. Actually, if the polyhydric phenol is condensed with greater than two moles of ketone for each mole of polyhydric phenol, only up to two moles of ketone appear to react and the excess ketone remains unreacted and acts as a solvent which can be removed later in processing the resin.

In the preparation of the new class of glycidyl ethers of this invention, it is preferable that the polyhydric phenol-ketone resin be reacted with an excess of epichlorohydrin. It has been found that about a one mole excess is desirable for each free phenolic hydroxyl that is to be etherified, although at times a greater excess is desirable for ease in handling the reaction. In certain instances, it has been found advisable to use a solvent for the expoxidation reaction. Excess epichlorohydrin can act as the solvent or other solvents, such as n-butanol, amyl alcohol, dioxane and the like can be employed. For purposes of practicing this invention, it is adequate to assume that the same number of free phenolic hydroxyl groups are available for reaction with the epichlorohydrin as were present on the original polyhydric phenol that was used to produce the mononuclear polyhydric phenol-ketone resin. Even if about five moles of epichlorohydrin is used for each free phenolic hydroxyl in the preparation of the epoxy resins of this invention, the excess epichlorohydrin is readily recoverable and reusable after distillation and removal of water.

The new class of glycidyl ether resins of the present invention can be prepared by adding a mononuclear polyhydric phenol-ketone resin to epichlorohydrin, dissolving the resin by heating and subsequently adding, over a period of time, in small increments an alkali hydroxide, such as sodium or potassium hydroxide. Several modifications to this procedure can be made, such as employing a solvent which is compatible with the resin and the epichlorohydrin; dissolving the alkali hydroxide in water or a compatible solvent; using solid alkali hydroxide, and the like. About one mole of alkali hydroxide is required for each free phenolic hydroxyl that is to be etherified. The reaction is exothermic and, once it has been initiated, can be maintained in a controlled manner by the rate of addition of the alkali hydroxide, or by heating or cooling as required. It is desirable to add the hydroxide in small increments because the addition of the entire amount can result in an uncontrollable reaction with expulsion of the mixture from the reaction vessel. The etherification reaction can be carried out between about 70° C. and about 140° C., but preferably between about 90° C. and about 110° C. After completion of the etherification, the excess epichlorohydrin along with water of reaction and solvent, if it is present, are removed by distillation, under reduced pressure, if desired. The etherified resin can be dissolved in a solvent, such as toluene and filtered or centrifuged to remove insoluble inorganic salts. Alternatively, the solution can be washed with water to remove the salts and distilled to adjust the solvent content, or to remove the solvent entirely if a solid resin is desired.

The new class of epoxy resins of this invention possess a range of physical properties which are primarily dependent upon the nature and properties of the phenolic-ketone resin, but also to a great extent upon the degree of epoxidation, the process of epoxidation and the subsequent processing of the epoxidized resin.

The epoxy resins of this invention can be utilized by themselves or in combination with other resins, plasticizers, modifying agents and the like. The epoxy resins can be cured and cross-linked by application of heat in the presence of catalysts, such as mono- and polyamines, both aliphatic and aromatic, and salts, such as triethanolamine borate, polycarboxylic acids and their anhydrides, both aliphatic and aromatic, phosphoric acid, and its partial esters and organo-derivatives, metallic chlorides, boron trifluoride, metallic alkyls and the like.

The resins of this invention can be combined with other epoxy resins, such as those enumerated above, or those produced by epoxidizing unsaturated compounds, or polymers, or with phenolic-formaldehyde resins, alkyd resins and modified alkyd resins and with silicone resins. As plasticizers, there can be used polyesters, such as those produced by the reaction of glycols with dicarboxylic acids, or glycerol with dicarboxylic acids. The reactive type of polyester is preferred such that the polyester chain is terminated by acid or hydroxyl groups, or there exist reactive groups distributed along the polyester polymer chain. Other reactive plasticizers which are particularly suited to the resins of the present invention are polysulfide polymers and polyamide polymers.

The new resins can be combined with fillers and pigments if so desired and used in this form as molding, casting, embedding, laminating and coating compositions. They can be used alone for these applications and are particularly suitable for adhesive application due to great bond strength between these new epoxy resins in their cured state and the metallic or non-metallic material to which they are bonded.

The following examples are given to illustrate the products and methods of the present invention. The examples are given only by way of illustration and are not to be construed as limiting in any respect to the spirit and scope of this invention.

EXAMPLE 1

| | |
|---|---|
| Resorcinol (USP) | Grams__ 55 |
| Acetone | do__ 64 |
| Concentrated hydrochloric acid | ml__ 2.5 |

The resorcinol and acetone were mixed and heated under a reflux condenser to obtain a clear solution. The source of heat was removed and the concentrated hydrochloric acid added. An exothermic reaction occurred which resulted in vigorous but controlled boiling. The contents of the reaction flask quickly became viscous and resinous and clouded due to the formation of water. Heating of the reaction was continued under reflux for a total period of 3¼ hours after which time the contents of the flask were poured into one liter of water. The water was heated to boiling, the viscous resin kneaded thoroughly to work out residual acid and any possible unreacted resorcinol and acetone. The resin became progressively harder on kneading and finally became a coarse powder even in boiling water. The slurry was filtered under suction and dried. A yield of 80 grams of pale yellow resin was secured.

| | |
|---|---|
| Resorcinol-acetone resin described above | Grams__ 29.6 |
| Epichlorohydrin | do__ 170 |
| Water | ml__ 1 |

The ingredients were mixed together and warmed to 95° C. to obtain a clear solution. Then, while maintaining the temperature at 95°–100° C., 15.2 grams of sodium hydroxide pellets were added over a period of one hour. The sodium hydroxide was calculated to be of the correct proportion to allow etherificaiton of both phenolic hydroxyls attached to the benzene rings present in the molecule of resorcinol-acetone resin. After heating an additional 1½ hours at 100° C., the excess epichlorohydrin was removed by distillation to a final pot temperature of 130° C. The resin was cooled, 83 ml. of benzene added and stirred to yield a solution. The solution was washed with water to remove soluble salts, dried and the benzene distilled off. A pale yellow, hard resin was obtained.

A portion of this resin was catalyzed with 2% of diethylenetriamine and heated at 80° C. in the form of a film for a number of hours. Upon immersing the film in toluene and allowing it to remain in contact therewith for about one month, no swelling, dissolution or other effects upon the film were noted indicating complete cure and cross-linking. On the other hand, a film of the uncatalyzed resin was heated at 80° C. for two weeks. Upon contacting the film with toluene, it immediately dissolved to yield a clear solution. This indicates a very considerable degree of stability in the uncatalyzed resin.

EXAMPLE 2

| | |
|---|---|
| Resorcinol (USP) | Grams__ 55 |
| Acetone | do__ 64 |
| Concentrated hydrochloric acid | ml__ 2.5 |

The resorcinol and acetone were heated together to obtain a clear solution and then the hydrochloric acid added. After the exothermic reaction had subsided, heating under reflux was continued for a period of eight hours. After this, the resin was heated under vacuum to remove volatile material. The solid resin was dissolved in fresh acetone to form a clear solution and this solution poured into water in a thin stream to precipitate the resin. After washing, filtration and drying a yield of 86.3 grams of pale yellow resin was obtained. This resin had a melting point of 175°–180° C. and a molecular weight of 1703.

| | |
|---|---|
| Resorcinol-acetone resin described above | Grams 29.7 |
| Epichlorohydrin | do 171.2 |
| Water | do 1.1 |

The ingredients were mixed and heated to 95° C. When a clear solution was obtained, 15.2 grams of sodium hydroxide pellets were added over a period of 15 minutes. The temperature was controlled between 95°–100° C. and the mixture heated for an additional period of 4 hours at 100° C. Excess epichlorohydrin and water of reaction were removed by distillation at 50° C. under 60 mm. Hg pressure yielding a total distillate of 138.1 grams. The epoxy resin containing salt was heated with 200 ml. of benzene to dissolve the resin and washed with water to remove the salt. The benzene solution was dried and the benzene removed under reduced pressure at 45° C. The hard resin was dissolved in acetone and the clear acetone solution poured in a thin stream into water to precipitate and wash the resin. After filtration and drying a pale yellow resin was secured. This resin had a melting point of 115°–125° C. and did not discolor even on heating to 200° C. where it remained fusible for a considerable period. It was calculated to contain an average of 4.5 glycidyl ether groups per average resin molecule.

Upon being catalyzed with amines, or acid anhydrides and heated, the resin cured to an insoluble and infusible form which was unaffected by solvent.

EXAMPLE 3

| | |
|---|---|
| Resorcinol (USP) | Grams 55 |
| Cyclohexanone | do 100 |
| Concentrated hydrochloric acid | ml 4 |

The resorcinol and cyclohexanone were mixed and heated to secure a clear solution. The hydrochloric acid was then added and an exothermic reaction occurred. After the initial reaction had subsided, the mixture was heated under reflux at 100° C. for 4 hours. During this time the color of the reactants changed from yellow to green to orange and the contents of the flask set up to a hard brittle resin. This resin was soluble and fusible, however, and it was dissolved in acetone to give a clear solution and the acetone solution poured in a thin stream into water to precipitate and wash the resin. After filtration and drying, a yield of 133 grams of yellow resin was secured which had a melting point of 180°–240° C.

| | |
|---|---|
| Resorcinol-cyclohexanone resin described above | Grams 133 |
| Epichlorohydrin | do 555 |

The resin was heated with the epichlorohydrin to obtain a clear solution. While maintaining the temperature at 90°–100° C., 133 grams of a 30% aqueous solution of sodium hydroxide were added dropwise with stirring to the solution over a period of one hour. After the addition had been completed, the heating and stirring at 100° C. was continued for three hours. Excess epichlorohydrin and water was removed by distillation at 40 to 50 mm. Hg pressure. The hard residual resin was dissolved in acetone and the acetone solution poured in a thin stream into water. The resin precipitated and was washed free of salt. It was then filtered and dried yielding a yellow, orange solid which was stable to heat but which could be rapidly cured to an infusible, insoluble form by heating with epoxy resin catalysts of the type described hereinabove.

EXAMPLE 4

| | |
|---|---|
| Resorcinol (USP) | grams 55 |
| Methylethyl ketone | do 75 |
| Concentrated hydrochloric acid | ml 5 |

The resorcinol and ketone were mixed and heated to secure a clear solution. The acid was then added resulting in an exothermic reaction. When this reaction had subsided, heating at 100° C. was continued for a total of six hours. The resulting resinous material was dissolved in acetone and the acetone solution added in a thin stream to hot water. The resin precipitated, was washed with hot water, filtered and dried. A yellow resin was secured having a melting point of 100°–110° C. A yield of 104 grams was obtained.

| | Grams |
|---|---|
| Resorcinol - methylethyl ketone resin described above | 104 |
| Epichlorohydrin | 185 |
| n-Amyl alcohol | 185 |
| Water | 20 |

The ingredients were mixed and heated to 90° C. to secure a solution. While maintaining the temperature at 90°–100° C., 56 grams of potassium hydroxide pellets were added with mechanical stirring over a period of one hour. Thereafter the mixture was heated at 95° C. for about three hours. The excess epichlorohydrin and amyl alcohol was removed by distillation at 50°–60° C. under reduced pressure. The resulting resin was dissolved in acetone and the acetone solution added to warm water in a thin stream to precipitate the resin. The resin was washed with water, filtered and dried. A low melting yellow composition was obtained which cured rapidly on application of heat when epoxy resin catalysts of the type described hereinabove were present.

EXAMPLE 5

| | |
|---|---|
| Hydroquinone | grams 50 |
| Acetone | do 50 |
| Concentrated hydrochloric acid | ml 8 |

The ingredients were mixed together and heated in a water bath under a reflux condenser at boiling for 16 hours. After washing with water and drying, a soft balsam-like brown resinous material was secured. This resinous material was epoxidized by dissolving in 369 grams of epichlorohydrin and 10 ml. of water, heating to 95° C. and adding slowly over a period of one hour with stirring 40 grams of sodium hydroxide pellets while maintaining the temperature between 90°–100° C. After the addition was completed, the mixture was heated at 100° C. for four more hours, then the excess epichlorohydrin and water removed by distillation under reduced pressure. The viscous material which resulted was dissolved in toluene, washed with water, dried and the toluene removed by distillation at reduced presure. The viscous material was brown in color and soft and sticky at room temperature. It cured readily with epoxy resin catalysts to a tough flexible composition.

EXAMPLE 6

| | |
|---|---|
| Catechol (1,2-dihydroxybenzene) | grams 30 |
| Methylethylketone | do 45 |
| Concentrated hydrochloric acid | ml 5 |

The above ingredients were mixed and heated under a reflux condenser for 16 hours. An orange oily product was obtained. It was epoxidized by the procedure used with the resin of Example 5 to yield an oily glycidyl ether which cured readily on heating with epoxy resin catalysts such as diethylenetriamine.

EXAMPLE 7

Different proportions of reactants give different products. Within any one particular system of resins of the present invention numerous variations can be made which result in products having a considerable range of physical properties. This is illustrated in Table I given below which presents data of examples in which resorcinol was reacted with various proportions of mesityl oxide and acetone, respectively. The general properties of these resins are given. They were then epoxidized by the procedure indicated which is similar to that used in Example 5. The general characteristics of the epoxy resins are given. All the resins were stable to heat in the uncatalyzed form and cured readily to infusible and insoluble products when heated in the presence of epoxy resin catalysts of the type described hereinabove.

*Table I*

|  | Resin A | Resin B | Resin C | Resin D |
|---|---|---|---|---|
| Resorcinol, gms | 55 | 55 | 55 | 55 |
| Acetone, gms | 32 | 96 | | |
| Mesityl oxide, gms | | | 50 | 100 |
| Conc. HCl, ml | 1.3 | 3.3 | 2.5 | 5.0 |
| Yield Resin, gms | 73.6 | 96.3 | 92.0 | 126.3 |
| M.P., °C., Resin | 108–110 | 218–220 | 130–135 | 165–170 |
| Epichlorohydrin, gms | 369 | 369 | 369 | 369 |
| NaOH, gms | 40 | 40 | 40 | 40 |
| Appearance | Yellow—low melting | Yellow—high melting | Hard, brittle, brown | Hard, brittle, brown |

EXAMPLE 8

Resorcinol (USP) _____grams__ 55
Acetone _____do____ 225
Concentrated hydrochloric acid _____ml__ 10

The resorcinol and acetone were heated together under reflux conditions. The hydrochloric acid was added slowly over a twenty minute period, and the reaction temperature was controlled between 55°–65° C. A slight yellowing of the reaction mixture was observed during the addition of the acid, this color changed to a cloudy amber upon continued heating under reflux for an additional 4½ hours. One hundred grams of the reaction mixture was withdrawn after 4½ hours of heating; this mixture was poured slowly into rapidly agitated water to precipitate the resin. The resin was filtered, washed with water, and dried; 29.8 grams of an acetone soluble white powdery resin was obtained. A melting point of 200°–205° C. was observed.

190 grams of the original reaction mixture as given above containing excess acetone
210 grams epichlorohydrin
50 grams 30% aqueous sodium hydroxide The reaction mixture, as described above (i.e., resin, excess acetone, hydrochloric acid), was heated under reflux with the epichlorohydrin. The 30% sodium hydroxide solution was added slowly over a one hour period, and the temperature maintained at 70°–75° C. An orange color developed upon addition of the base; this color became progressively lighter, and ultimately became a pale yellow after three additional hours under reflux conditions. Excess acetone was distilled off at normal pressure, the aqueous salt-containing layer was separated from the organic layer, and the excess epichlorohydrin was removed at reduced pressure. An amber solid resin was obtained; this resin was dissolved in acetone, precipitated in water, filtered, washed, and dried. A white powdery resin with a melting point of 178°–182° C. was secured.

Upon being heated with diethylenetriamine catalyst, this epoxy resin was converted into an infusible and insoluble form. The uncatalyzed resin remained permanently fusible and soluble even after being heated to a temperature of 200° C.

EXAMPLE 9

By varying the mole ratio of resorcinol to acetone over the range 1:1 to 1:8, using the general procedure given in Example 1, it was observed that the stoichiometric ratio or reactants was approximately one mole of resorcinol to every 2.5 moles of acetone (Table II). Epoxidation of the resorcinol-acetone condensation products as listed in Table II resulted in a series of resinous materials which were fusible, highly soluble, and which contained an average of 5 epoxy groups per molecule (Table III).

*Table II*

PROPERTIES OF RESORCINOL-ACETONE CONDENSATION PRODUCTS AS PREPARED WITH SEVERAL DIFFERENT MOLE RATIOS OF REACTANTS

| Mole Ratio, Resorcinol/Acetone | Property of Resulting Intermediate | |
|---|---|---|
| | Melting Point, °C. | Molecular Weight [a] |
| 1:1 | 108–110 | 1,200 |
| 1:2 | 175–180 | 1,700 |
| 1:3 | 218–220 | 3,700 |
| 1:4 | 210–220 | 3,000 |
| 1:8 | 200–205 | 3,600 |

[a] Apparent weight-average molecular weight from light scattering measurements of polymer in methylethylketone solution.

*Table III*

PROPERTIES OF EPOXIDE RESINS DERIVED FROM RESORCINOL-ACETONE CONDENSATION PRODUCTS

| Properties | Resorcinol-Acetone Intermediate [a] | | | |
|---|---|---|---|---|
| | 1:2 | 1:4 | 1:8 | 1:18 |
| Melting Point, °C. [b] | 130–135 | 175–177 | 178–182 | 157–160 |
| Epoxy Equivalent/100 grams [c] | 0.40 | 0.22 | 0.21 | 0.26 |
| Epoxide Groups/Molecule: | | | | |
| Found [d] | 4.4 | 4.8 | 4.6 | 5.7 |
| Theoretical [e] | 4.5 | 9.0 | 9.0 | 9.0 |
| Viscosity [f] | E | H | H | G–H |

[a] Designates ratio of resorcinol to acetone in intermediate synthesis.
[b] As determined on Fisher-Johns melting point block.
[c] As determined by pyridinium chloride-pyridine method.
[d] Approximated from postulated structure, adjusted molecular weight of intermediate, and determined epoxy equivalent pre 100 grams.
[e] Approximated from postulated structure and adjusted molecular weight of intermediate.
[f] Gardner-Holdt viscosity: 40% solutions of resin in butyl Carbitol.

It is apparent from the above examples that the epoxy resins of this invention are particularly stable to heat in the uncatalyzed form. Catalysis brings about a rapid conversion to insoluble and infusible products which can be prepared in a variety of forms. The compositions of this invention possess outstanding chemical resistance and have electrical properties which make them useful in a number of electronic applications.

While the examples described above have been illustrative of the products and processes of this invention and while various embodiments have been described, it is to be understood that the invention is not to be restricted thereto and that the invention is intended to cover any and all modifications which would be apparent to persons skilled in the art and that come within the scope of the claims hereinafter set forth.

What is claimed is:

1. A glycidyl ether prepared by reacting a mononuclear polyhydric phenol selected from the group consisting of dihydric phenols and trihydric phenols and a ketone selected from the group consisting of aliphatic ketones and alicyclic ketones by heating the phenol-ketone reaction mixture substantially free of water and consisting essentially of about 1 mole of the phenol and about 1 to about 8 moles of the ketone at about 100° C. under reflux to produce a resinous copolymerization product having a molecular weight of at least about 1200, and heating the resulting resinous copolymerization product in admixture with epichlorohydrin to produce the glycidyl ether.

2. A glycidyl ether composition prepared by reacting a mononuclear polyhydric phenol selected from the group consisting of dihydric phenols and trihydric phenols and a ketone selected from the group consisting of aliphatic ketones and alicyclic ketones by heating in the presence of a strong acid catalyst the phenol-ketone reaction mixture substantially free of water and consisting essentially of about 1 mole of the phenol and about 1 to about 8 moles of the ketone at about 100° C. under reflux to produce a resinous copolymerization product having a molecular weight of at least about 1200, and heating the resulting resinous copolymerization product with epichlorohydrin in a basic medium to produce the glycidyl ether composition.

3. A glycidyl ether prepared by reacting a mononuclear polyhydric phenol selected from the group consisting of dihydric phenols and trihydric phenols and acetone by heating the phenol-acetone reaction mixture substantially free of water and consisting essentially of about 1 mole of the phenol and about 1 to about 8 moles of acetone at about 100° C. under reflux to produce a resinous copolymerization product having a molecular weight of at least about 1200, and heating the resulting resinous copolymerization product in admixture with epichlorohydrin to produce the glycidyl ether.

4. A glycidyl ether prepared by reacting a mononuclear polyhydric phenol selected from the group consisting of dihydric phenols and trihydric phenols and methylethylketone by heating the phenol-methylethylketone reaction mixture substantially free of water and consisting essentially of about 1 mole of the phenol and about 1 to about 8 moles of methylethylketone at about 100° C. under reflux to produce a resinous copolymerization product having a molecular weight of at least about 1200, and heating the resulting resinous copolymerization product in admixture with epichlorohydrin to produce the glycidyl ether.

5. A glycidyl ether prepared by reacting a mononuclear polyhydric phenol selected from the group consisting of dihydric phenols and trihydric phenols and cyclohexanone by heating the phenol-cyclohexanone reaction mixture substantially free of water and consisting essentially of about 1 mole of the phenol and about 1 to about 8 moles of cyclohexanone at about 100° C. under reflux to produce a resinous copolymerization product having a molecular weight of at least about 1200, and heating the resulting resinous copolymerization product in admixture with epichlorohydrin to produce the glycidyl ether.

6. A glycidyl ether prepared by reacting resorcinol and a ketone selected from the group consisting of aliphatic ketones and alicyclic ketones by heating the resorcinol-ketone reaction mixture substantially free of water and consisting essentially of about 1 mole of resorcinol and about 1 to about 8 moles of the ketone at about 100° C. under reflux to produce a resinous copolymerization product having a molecular weight of at least about 1200, and heating the resulting copolymerization product in admixture with epichlorohydrin to produce the glycidyl ether.

7. A glycidyl ether prepared by reacting resorcinol and acetone by heating the resorcinol-acetone reaction mixture substantially free of water and consisting essentially of about 1 mole of resorcinol and about 1 to about 8 moles of acetone at about 100° C. under reflux to produce a resinous copolymerization product having a molecular weight of at least about 1200, and heating the resulting resinous copolymerization product in admixture with epichlorohydrin to produce the glycidyl ether.

8. A glycidyl ether prepared by reacting resorcinol and methylethylketone by heating the resorcinol-methylethylketone reaction mixture substantially free of water and consisting essentially of about 1 mole of resorcinol and about 1 to about 8 moles of methylethylketone at about 100° C. under reflux to produce a resinous copolymerization product having a molecular weight of at least about 1200, and heating the resulting resinous copolymerization product in admixture with epichlorohydrin to produce the glycidyl ether.

9. A glycidyl ether prepared by reacting resorcinol and cyclohexanone by heating the resorcinol-cyclohexanone reaction mixture substantially free of water and consisting essentially of about 1 mole of resorcinol and about 1 to about 8 moles of cyclohexanone at about 100° C. under reflux to produce a resinous copolymerization product having a molecular weight of at least about 1200, and heating the resulting resinous copolymeriaztion product in admixture with epichlorohydrin to produce the glycidyl ether.

10. A glycidyl ether prepared by reacting resorcinol and acetone by heating the resorcinol-acetone reaction mixture substantially free of water and consisting essentially of about 1 mole of a resorcinol and at least about 2 moles of acetone in the presence of an acid catalyst at about 100° C. under reflux to produce a resinous copolymerization product having a molecular weight of at least about 1200, and heating the resulting resinous copolymerization product in admixture with epichlorohydrin to produce the glycidyl ether.

11. The method of producing an epoxy resin which comprises the steps of reacting a mixture consisting essentially of a ketone selected from the group consisting of aliphatic ketones and alicyclic ketones and a mononuclear polyhydric phenol selected from the group consisting of dihydric phenols and trihydric phenols substantially free of water in an acid medium at about 100° C. under reflux to form a resinous copolymerization product having a molecular weight of at least about 1200, and heating the resulting resinous copolymerization product in admixture with epichlorohydrin in a basic medium to produce the epoxy resin.

12. The method of producing an epoxy resin which comprises the steps of reacting a mixture consisting essentially of acetone and a mononuclear polyhydric phenol selected from the group consisting of dihydric phenols and trihydric phenols substantially free of water in an acid medium at about 100° C. under reflux to form a resinous copolymerization product having a molecular weight of at least about 1200, and heating the resulting resinous copolymerization product in admixture with epichlorohydrin in a basic medium to produce the epoxy resin.

13. The method of producing an epoxy resin which comprises the steps of reacting a mixture consisting essentially of methylethylketone and a mononuclear polyhydric phenol selected from the group consisting of dihydric phenols and trihydric phenols substantially free of water in an acid medium at about 100° C. under reflux to form a resinous copolymerization product having a molecular weight of at least about 1200, and heating the resulting resinous copolymerization product in admixture with epichlorohydrin in a basic medium to produce the epoxy resin.

14. The method of producing an epoxy resin which comprises the steps of reacting a mixture consisting essentially of cyclohexanone and a mononuclear polyhydric phenol selected from the group consisting of dihydric phenols and trihydric phenols substantially free of water in an acid medium at about 100° C. under reflux to form a resinous copolymerization product having a molecular weight of at least about 1200, and heating the resulting resinous copolymerization product in admixture with epichlorohydrin in a basic medium to produce the epoxy resin.

15. The method of producing an epoxy resin which comprises the steps of reacting a mixture consisting essentially of acetone and resorcinol substantially free of water in an acid medium at about 100° C. under reflux to form a resinous copolymerization product having a molecular weight of at least about 1200, and heating the resulting resinous copolymerization product in admixture with epichlorohydrin in a basic medium to produce the epoxy resin.

16. The method of producing an epoxy resin which comprises the steps of reacting a mixture consisting essentially of at least about 2 moles of acetone and about 1 mole of resorcinol substantially free of water in the presence of hydrochloric acid at about 100° C. under reflux to form a resinous copolymerizaiton product having a molecular weight of at least about 1200, and heating the resulting resinous copolymerization product in admixture with epichlorohydrin in the presence of an alkali metal hydroxide to produce the epoxy resin.

17. The method of producing an epoxy resin which comprises the steps of reacting a mixture consisting essentially of methylethylketone and resorcinol substantially free of water in an acid medium at about 100° C. under reflux to form a resinous copolymerization product having a molecular weight of at least about 1200, and heating the resulting resinous copolymerization product in admixture with epichlorohydrin in a basic medium to produce the epoxy resin.

References Cited in the file of this patent

UNITED STATES PATENTS

| | | |
|---|---|---|
| 2,902,471 | Bruin | Sept. 1, 1959 |
| 2,947,760 | Bruin et al. | Aug. 2, 1960 |